United States Patent Office 3,350,244
Patented Oct. 31, 1967

3,350,244
FLUX LIFE EXTENDER
Dunbar L. Shanklin, 12 Everett Ave.,
Winchester, Mass. 01890
No Drawing. Filed Apr. 19, 1965, Ser. No. 449,325
7 Claims. (Cl. 148—26)

ABSTRACT OF THE DISCLOSURE

This invention relates to the use in a zinc-ammonium chloride solder flux of the type intended to be used on high temperature solder baths of a flux life extender which comprises granules of a porous particulate absorbent selected from the group consisting of activated alumina, silica gel and activated alumino-silicate where the granules have a surface area of at least 100 square meters per gram and a volume of available pores of at least 0.15 cubic centimeter per gram.

---

This invention relates to a flux life extender especially suitable for use in connection with solder fluxes intended for use on high temperature solder baths. This invention also relates to solder fluxes especially adapted to be used on high temperature solder baths and containing the aforesaid flux life extender.

The purpose of the present invention is to provide means for extending the useful life of fluxes especially fluxes of the type used in conjunction with high temperature solder baths such as those employed in the can making industry. The normal can is made by first forming a tubular can body and thereafter applying a can end to both ends of this body. The normal can body is made by forming a flat sheet metal body blank in which a pair of marginal edges opposing one another are bent back upwardly on one edge, downwardly on the other to form "body hooks." In the can body maker, the body blanks are bent to form a cylinder with the body hooks interlocked. The hooks are then flattened by bumping and molten solder is flowed into the interlocked seam by passing the seam over a solder roll which rotates in a bath of molten solder.

Historically, except for a few specialty cans, where a pure tin solder is used for the side seams, the conventional solder used in the can industry was a solder containing 40% tin and 60% lead—a so-called 40–60 solder. More recently the tendency has been to use a low tin solder with a tin content ranging from between 2 to 4% such as the so-called 2–98 solder which contains 2% tin and 98% lead for the side seam of normal tin cans. The change-over from a 40–60 solder to a 2–98 solder has been accelerated for two reasons. In the first place, a solder containing 2 to 4% tin such as the 2–98 solder, has a much quicker freezing point, or a much smaller solidification temperature range than does a 40–60 solder. The use of such a low tin solder not only permits the body maker to be operated at a faster rate, but also reduces the possibility that the side seam will be distorted between the time that the solder is applied and the time that the solder solidifies. Secondly, since the cost of tin is somewhat higher than the cost of lead, the use of a low tin solder reduces the cost of manufacture. As a result, under present can making practice, approximately 90% of all cans having a soldered side seam are made using a low tin solder.

The change-over from the use of 40–60 solder to 2–98 solder has not been without its difficulties. In the first place the melting point of a 2–98 solder is substantially higher than that of a 40–60 solder. As a result in replacing a 40–60 solder with the 2–98 solder it has been necessary to raise the temperature of the solder bath. Since a 2–98 solder has a melting point of about 625° F. and it is necessary to maintain the temperature of the solder in the bath at a level about 100° F. in excess of the melting point, solder baths containing a 2–98 solder are normally maintained at a temperature of about 725° F. but may vary between 690° F. and 760° F.

In addition, as is well known, it is necessary in order to form a smooth even film of solder on the solder roll, that the steel solder roll be well "tinned," i.e. that a layer of $FeSn_2$ be maintained on the surface of the roll. The reduction of the tin content of the solder makes it that much more difficult to maintain the roll in a well tinned condition. To do so requires the use of a very strong, highly active flux.

Such a flux is the zinc-ammonium chloride flux of the general type that has been used by can makers for the past fifty years to protect the molten solder on the solder bath, and to clean and tin the surface of the solder roll. When used to maintain the surface of the solder roll in a well tinned condition in the presence of a low tin solder such as 2–98 solder it is necessary that the flux be maintained in a molten state and that it contain a relatively high percentage of ammonium chloride in combination with the zinc chloride. There is a limit, however, to the proportion of ammonium chloride that can be used in combination with a zinc-chloride in such a flux. If the proportion of ammonium chloride in such flux exceeds about 38% by weight on the total weight of the zinc chloride plus the ammonium chloride the flux will not melt even at temperatures in excess of 760° F. Rather the excess ammonium chloride is released by sublimation. Pure ammonium chloride sublimes at a temperature of 640° F. The 2:1 zinc ammonium chloride double salt which contains two mols of ammonium chloride for each mol of zinc chloride and is therefore 44% by weight of ammonium chloride on the total weight of the double salt loses ammonium chloride by sublimation at about this same temperature.

When a zinc ammonium chloride flux composition containing more than 38% by weight of ammonium chloride is heated to 650° F. or above, the loss of ammonium chloride by sublimation is quite rapid with the flux composition evolving voluminous clouds of white ammonium chloride smoke. When through the loss of ammonium chloride the ratio of ammonium chloride by weight to the weight of the total zinc ammonium chloride is reduced to 38% the zinc ammonium chloride melts readily into a thin oily liquid. The rate of loss of ammonium chloride by sublimation however, is not reduced substantially until the proportion of ammonium chloride by percent weight of the total chlorides is reduced to a much lower level than the 38% at which the zinc ammonium chloride composition melts. Thus the melted zinc ammonium chloride flux composition continues to boil vigorously unless something is done to prevent the rapid loss of ammonium chloride. If the flux is maintained at a temperature of 650° F. the loss of ammonium chloride will continue until the percentage by weight of the ammonium chloride based on the total weight of the zinc chloride plus ammonium chloride falls to about 15%. At this point an equilibrium condition is reached and the rate of loss of the ammonium chloride from the zinc ammonium chloride composition is drastically reduced. If, however, the temperature of the melted zinc ammonium chloride flux is maintained at a level of 725–750° F. such an equilibrium condition is not reached until the percentage by weight of the ammonium chloride in the flux reaches a level of about 5 or 6%, and the ammonium chloride will continue to boil away from the flux composition until sufficient ammonium chloride has been lost to bring the weight percent down to this level.

This loss of ammonium chloride from the zinc ammonium chloride flux composition reduces the fluxing efficiency, and eventually, when the percentage of ammonium chloride becomes too low, the flux becomes "spent" and must be removed from the solder bath and replaced by a layer of fresh flux. The spent flux still has considerable capacity to absorb lead and tin oxide, but its speed of action has become too slow to maintain a uniform layer of solder on the rapidly rotating steel solder roll. In a typical body maker where a 4 inch diameter solder roll is rotated at 120 r.p.m., the time of contact of the surface of the roll with a ½ inch layer of melted flux on the surface of the solder bath during each revolution is only 1/50 second which is an extremely short interval of time. Hence a strong active flux is needed to provide the fast fluxing action required.

At 725° F. a typical zinc-ammonium chloride flux has a total life of less than four hours even with the addition of additional quantities of fresh flux composition. Thereafter even the addition of fresh quantities of zinc-ammonium chloride flux composition will not maintain the roll in a clean tinned condition and the spent charge of flux must be removed from the pot and replaced by a fresh charge. During the time required to remove the spent flux, and to reestablish a molten surface layer of active fresh flux so that the roll will be properly cleaned and well tinned, the body maker must be shut down. This frequent interruption required to replace spent flux and to restore the solder roll to a cleaned well tinned condition, seriously interferes with the production of cans.

I have found that it is possible to extend the active life of a flux substantially by adding to the flux composition certain inert additives which are referred to as flux life extenders. Through the use of such flux life extenders it is possible to extend the life of a given charge of flux composition substantially thereby reducing the frequency of shut-down of the body maker for flux replacement which in turn reduces the down time of the body maker and increases the number of cans that can be made in a given time period. Indeed through the use of such flux life extenders it is possible to extend the life of a charge of flux such that the body maker may be operated 8, 12, 16 or even more hours without shut-down for flux replacement. This effectively eliminates flux replacement as a cause for shutting down a can making line since the line must be shut down periodically at the end of a shift or at least at the end of every second shift to remove the deposits of carbonaceous matter which builds up in the melted flux.

The flux life extenders of the present invention comprise the general class of porous particulate adsorbents such as activated alumina, silica gel or molecular traps (molecular sieves) having a surface area of at least 100 sq. meters per gram and a volume of available pores of at least 0.15 cc. per gram. The flux life extender should, as are the particular materials listed, be substantially inert at the temperatures of use in the presence of the molten metal and the melted flux.

The granules which are preferably spherical should be somewhat regular in shape to avoid inter-particulate binding while floating in the molten flux. Particle size is not particularly critical although granules having a diameter larger than about ½ the thickness of the layer of molten flux (i.e. ¼ inch diameter when the flux layer has a typical ½ inch thickness) should preferably be avoided as well as the presence of any substantial quantities of dust (i.e. particles having a diameter small enough to pass through 100 mesh U.S.). These flux life extenders, appear to be effective when present in any quantity in excess of about 6 cubic centimeters of bulk volume per 100 cc. of melted flux (or, in the case of granules having a particle density similar to that of the particular adsorbents listed, in excess of 1% by weight of the weight of fusible flux ingredients) up to that proportion of granules which substantially completely absorb the entire melted flux layer.

The flux life extenders apparently operate by absorbing melted flux high in ammonium chloride content within the internal pores of the particles thereafter releasing the adsorbed ammonium chloride slowly to the melted flux as the ammonium chloride in the melted flux becomes diminished. That this is the probable mechanism for the effectiveness of these flux life extenders is shown by the fact that the effectiveness can be increased by pretreating the flux life extenders with a solution of chlorides thereby pre-wetting or conditioning the walls of the pores or interstices for the entry of melted zinc-ammonium chloride flux, or by pre-charging the pores of the flux life extenders with ammonium chloride or with zinc-ammonium chloride compounds having a high ammonium chloride content.

I refer to the presumed mode of operation of the flux life extenders as "super charging" because it would appear from my observations that the particulate adsorbents are "charged" at the beginning with a flux rich in ammonium chloride, and that they retain this charged flux for a long time feeding it back slowly into the melted flux as needed. In the course of my tests I have made and tested solder roll fluxes with four variations of this Supercharging technique, using granules which were:

(A) Self-charging—or Supercharging in situ.
(B) Self-charging of pre-treated granules.
(C) Supercharged granules which were precharged in a concentrated aqueous solution of chlorides rich in ammonium chloride.
(D) Supercharged granules which were precharged in a melted zinc ammonium chloride flux rich in ammonium chloride.

The composition of these fluxes and the supercharging techniques employed are described fully in the following examples. The effectiveness of these materials as flux life extenders are demonstrated by including as controls the same basic zinc ammonium chloride fluxes, but containing no "Supercharged" Granules or Superchargeable Granules.

Since the terms "Supercharged," "Supercharging," "Superchargeable," "Precharged," "Pretreated," "Self-charging," "Supercharging-in-situ" are used frequently, it is desirable to explain or define my meaning of these terms.

Supercharged refers to granules which have been charged with chlorides rich in ammonium chloride, above 30% ammonium chloride on the total chlorides contained in the granules. This supercharging may be accomplished either by treating the granules with an aqueous solution of chlorides containing ammonium chloride with subsequent drying or by immersing the granules in a melted mixture of chlorides containing ammonium chloride.

Supercharging refers to any method by which the high surface area granules receive a charge of chlorides rich in ammonium chloride. This may be accomplished by the methods described above or it may take place when my solder roll flux containing high surface area granules first melts on the solder bath and the granules adsorb the freshly melted flux before it loses much of its ammonium chloride by volatilization. This latter method of Supercharging is also referred to as "Self-charging" or "Super-charging-in-situ."

Self-charging of pretreated granules refers to this Supercharging-in-situ process which takes place when the solder roll flux first melts, but it applies to granules that have been given a pre-treatment with an aqueous solution of chlorides which "wets" or conditions the surfaces of the pores and facilitates the entry of the melted zinc ammonium chloride flux.

Superchargeable describes granules which are capable of being supercharged. It refers not only to granules, such as activated alumina, activated silica gel or molecular sieves, which will become supercharged-in-situ in freshly melted zinc ammonium chloride, but also to similar granules which have received the "wetting" or conditioning pretreatment, but have not been precharged or loaded with a charge of chlorides high in ammonium chloride.

EXAMPLES OF FLUX LIFE EXTENDERS

Example 1.—SUPERCHARGED Silica Gel Granules #1 (SSG #1)

I have discovered that a simple, inexpensive way to make highly porous silica gel granules that are automatically treated by inorganic chlorides during the course of manufacture is to mix granules of a soluble silicate containing water of hydration, such as Sodium Metasilicate Pentahydrate, $Na_2SiO_3 \cdot 5H_2O$, with powdered ammonium chloride, allow this mixture to react for several hours and then dry to remove the water. The resulting loosely agglomerated product is easily crushed to form granules of silica gel of approximately the same size and shape as the original granules of sodium metasilicate pentahydrate. The surfaces of the tiny pores of these silica gel granules are "wetted" or coated with sodium chloride and ammonium chloride by this method, so I have called the granules made by the formulation and method described here, "Supercharged Silica Gel Granules #1."

| | Grams |
|---|---|
| Sodium silicate pentahydrate (10–20 mesh U.S.) | 1000 |
| Powdered ammonium chloride | 600 |
| Total weight | 1600 |

These ingredients were mixed by hand with a large spoon in a bowl for ten minutes. During the mixing, strong ammonium vapors were evolved and the mix became very moist. This was caused by the reaction of the sodium metasilicate pentahydrate with the powdered ammonium chloride, releasing ammonia gas and water as follows:

$$Na_2SiO_3 \cdot 5H_2O + 2NH_4Cl \rightarrow SiO_2 + 2NaCl + NH_3 + 6H_2O$$

In damp, humid weather, the reaction starts almost immediately. In dry weather, the reaction is slower to start, but, once started, it proceeds at a steady pace. However it takes time for the small ammonium chloride crystals which coat the sodium metasilicate granules in the form of a moist slurry to dissolve and enter the metasilicate granules by osmotic action. In doing so, more free water is produced, both by the chemical reaction of $Na_2SiO_3$ and $NH_4Cl$ and by the release of the five molecules of water of hydration. This water dissolves more ammonium chloride, which in turn reacts with more of sodium metasilicate within the granule and, thus, the reaction proceeds.

In dry weather, it is desirable to "trigger" or speed up the start of the reaction by mixing in about 1% of water after the sodium metasilicate pentahydrate and ammonium chloride have been dry mixed or damp mixed for a few minutes. The quantity of added water must be small, about 1%, because it is desirable to keep the small crystals of ammonium chloride on the larger granules of sodium metasilicate pentahydrate in the form of a wet slurry.

I then allowed this wet mix to stand at room temperature for 36 hours. The wet mix was then transferred to a shallow pan and dried in a hot air forced conventional dryer at 130°–140° F. for 36 hours. The temperature was then raised to 160° F. for 12 hours. The Supercharged Silica Gel Granules #1 were in the form of a loosely agglomerated block. This block was readily broken up and easily crushed by forcing through an 8-mesh screen. The #1 Granules were crisp and dry and had approximately the same size and shape as the original granules of the 10–20 mesh sodium metasilicate pentahydrate.

The 1600 grams total weight of ingredients yielded 935 grams of final product. Hence, the loss of water and ammonia totalled 665 grams. On a stoichiometric basis, 510 grams of ammonium chloride would fully react with 1000 grams of sodium metasilicate pentahydrate containing 295 grams of $Na_2O$, 287 grams of $SiO_2$ and 417 grams of $H_2O$.

Assuming complete reaction of the silicate, the calculated composition is as follows:

CALCULATED COMPOSITION OF SUPERCHARGED SILICA GEL GRANULES #1

| | Dry basis, percent by weight |
|---|---|
| $SiO_2$ | 30.7 |
| NaCl | 59.7 |
| $NH_4Cl$ | 9.6 |
| Total | 100.0 |

The physical proportions are as follows:

| | |
|---|---|
| Bulk density of SSG #1 grams per cc | 0.65 |
| Calculated particle density do | 1.10 |
| Pore volume with salts cc. per gram | 0.55 |
| Skeletal density | 2.2 |
| Bulk density of salt free granules grams per cc | 0.38 |
| Calculated particle density of salt free granules do | 0.63 |
| Pore volume of salt free granules cc. per gram | 1.12 |

These Supercharged Granules #1 were mixed with various formulations of zinc ammonium chloride fluxes and found to be extremely effective in extending the life of the flux when applied to solder baths operating at temperatures well above the boiling point of the ammonium chloride constituent in the flux. These test results are recorded in the Examples of Solder Roll Fluxes.

Example 2.—Supercharged Silica Gel Granules #2 (SSG #2)

I made by the following process "Supercharged Silica Gel Granules #2," marked SSG #2, using commercial activated silica gel 6–16 mesh U.S. granules (Grade #05, manufactured by the Davison Division of W. R. Grace & Co.) which I purchased from a laboratory supply house.

I heated to boiling (242° F.) 200 grams of $ZnCl_2 \cdot 3NH_4Cl$ (the so-called 3:1 crystals) and 200 grams of ammonium chloride in 265 grams of water. This formed a supersaturated solution with what appeared to be some fine crystals of undissolved ammonium chloride. I then added slowly with violent boiling and evolution of gases, 250 grams of 6–16 mesh activated silica gel granules and then added 100 grams of ammonium chloride with much stirring. After allowing this mix to stand one hour, during which time it cooled greatly, I weighed the mix and found that 105 grams of water had boiled off leaving 160 grams of water in the wet mix of Supercharged Granules #2.

This wet SSG #2 mix had the following composition:

| | Grams | $ZnCl_2$, g. | $NH_4Cl$, g. |
|---|---|---|---|
| $ZnCl_2 \cdot 3NH_4Cl$ | 200 | 108 | 92 |
| Ammonium Chloride | 300 | | 300 |
| Total $NH_4Cl$ | | | 392 |
| Silica gel | 250 | | |
| Total Solids | 750 | | |
| Water | 160 | | |
| Total Wet SSG #2 mix | 910 | | |

The wet mix had 17½% water. After drying for 2 hours at 140° F., the finished Supercharged Silica Gel Granules #2 were dry in appearance and feel although they still had almost 10% moisture retained.

The calculated composition of this SSG #2 is as follows:

| | Percent by weight |
|---|---|
| Zinc chloride | 13.0 |
| Ammonium chloride | 47.2 |
| Silica gel | 30.2 |
| Water | 9.6 |

Physical data for the silica gel from the suppliers' Bulletin is as follows:

| | |
|---|---|
| Mesh size | 6–16 |
| Bulk density _____ g. per cc | 0.72 |
| Skeletal density _____ do | 2.20 |
| Surface area _____ sq. m. per gram | 800 |
| Pore volume _____ cc. per gram | 0.43 |

Using a 60% volume factor, I have calculated the density of the individual silica gel particles, before my supercharging treatment, to be 1.20 grams per cc.

These Supercharged Silica Gel Granules #2 were mixed with zinc ammonium chloride fluxes and were found to be an extremely efficient flux life extender. Because so much ammonium chloride is contained within the pores of the silica gel granules, as a result of my Supercharging Method, it is possible to make a solder roll flux containing more than 38% ammonium chloride to total ammonium chloride plus zinc chloride which will, nevertheless, melt on a solder bath at 725° F. Flux J described in "Examples of Solder Roll Fluxes," contains a total of 40% ammonium chloride on total chlorides after the zinc oxide has reacted; but it will melt because the amount of ammonium chloride in the basic flux is only 33%. The basic flux surrounding the Supercharged Silica Gel Granules #2 melts and gradually loses ammonium chloride which is replaced by the excess ammonium chloride stored up within the pores in the granules.

This same technique may be employed to introduce higher melting point salts, such as, sodium chloride (M.P. 1472° F.), potassium chloride (M.P. 1427° F.), magnesium chloride (M.P. 1312° F.), calcium chloride (M.P. 1422° F.) or lead chloride (M.P. 934° F.), which melt much above 725° F. but which will slowly dissolve in melted zinc chloride and ammonium chloride mixes at 725° F. and at even much lower temperatures.

Flux J using SSG #2 also illustrates how a substantial percentage of water may be introduced safely in a mixture that is to be placed on a molten metal bath.

*Example 3.—Superchargeable Silica Gel Granules #3 (SSG #3)*

Superchargeable Silica Gel Granules #3, (SSF #3) are Division Silica Gel, Grade #05, 6–16 Mesh U.S. The data pertaining to this Grade #05 are tabulated in the detailed description of SSG #2.

Although these granules are not supercharged before the flux melts, nevertheless, they rapidly become supercharged by adsorbing within their many minute pores the freshly melted flux which is rich in ammonium chloride. I refer to this technique as supercharging "in situ."

Fluxes K and L show that SSG #3 is an efficient flux life extender, although not as efficient as SSG #2 which has been pre-charged with a saturated solution high in ammonium chloride.

*Example 4.—Superchargeable Silica Gel Granules #4 (SSG #4)*

The stoichiometric ratio of ammonium chloride to react fully with Sodium metasilicate pentahydrate is 51 parts by weight of ammonium chloride to 100 parts of metasilicate. In developing my Superchargeable Silica Gel Granules #4 I, therefore, used a ratio of 52 parts of ammonium chloride per 100 parts of metasilicate in order to have a small excess, but only a small excess, of ammonium chloride. This ratio is, however, not critical.

In my work with SSG #1, I had learned that my simple, inexpensive way of making highly porous silica gel granules resulted in a product wherein the size and shape of the original metasilicate particles had not been substantially altered. I, therefore, purchased a grade of sodium metasilicate pentahydrate which is commercially available in uniform sized "dry" spherical granules. These spherical granules are available in various mesh sizes. I used a grade which is rated 10–20 mesh and had the following screen analysis:

| U.S. Screen Numbers: | Percentage |
|---|---|
| On #8, maximum | 2 |
| Through #10 and on #20, maximum | 90 |
| Through #20 and on #40, maximum | 10 |
| Through #60 | 1 |

My SSG #4 was made by the method used in making SSG #1 using this grade of metasilicate and to the following formulation:

| | Grams |
|---|---|
| Sodium metasilicate pentahydrate (spherical granules 10–20 mesh) | 1000 |
| Powered ammonium chloride | 520 |
| Total weight | 1520 |

After drying for 36 hours at 130°–140° F., the temperature was raised to 160° F. for 12 hours. The yield of dry SSG #4 obtained from the 1520 grams of mix was 860 grams.

The calculated composition is as follows:

CALCULATED COMPOSITION OF SUPERCHARGEABLE SILICA GEL GRANULES #4

| | Percent by weight |
|---|---|
| $SiO_2$ | 33.4 |
| NaCl | 64.8 |
| $NH_4Cl$ | 1.8 |
| Total | 100.0 |

The size and shape of these Superchargeable Silica Gel Granules #4 are substantially the same as the original spherical metasilicate granules before the slow osmotic reaction with ammonium chloride. However, when the soluble salts had been removed from the SSG #4, there was a large reduction in bulk volume. 100 cc. bulk volume of SSG #4 decreased to a bulk volume of 55 cc. of pure silica gel granules having a bulk density of 0.38 gram per cc. There was a corresponding reduction in the size of the granules.

The physical properties of the silica gel granules free of salts are:

| | |
|---|---|
| Bulk density _____ per cc | 0.38 |
| Skeletal density _____ do | 2.20 |
| Particle density _____ do | 0.63 |
| Pore volume _____ cc. per gram | 1.12 |
| Size, mesh U.S. | 10 to 40 |

SSG #4 was employed in the R-Series of Flux Compositions and proved to be a highly efficient flux life extender over a wide range of ratios of bulk volume of pure silica gel granules per 100 cc. of melted flux. It is classed as a superchargeable granule because it does not have a substantial quantity of ammonium chloride or zinc chloride or other active fluxing ingredient. However, SSG #4 is very porous and highly adsorbent, so it readily adsorbs a large quantity of the freshly melted zinc ammonium chloride flux which is rich in ammonium chloride.

SSG #4 may be easily supercharged by concentrated solutions of inorganic salts in the manner described in detail in Example 2, explaining the supercharging of purchased silica gel granules. This step is described in Example 5 covering the manufacture of Supercharged Silica Gel Granules #5 from SSG #4.

*Example 5.—Supercharged Silica Gel Granules #5 (SSG #5)*

I used the same process and saturating solution employed to supercharge Davison silica gel granules to make my Supercharged Silica Gel Granules #2, SSG #2; but substituted my Superchargeable Silica Granules #4 for the Davison silica gel. I have called these supercharged granules, Supercharged Silica Gel Granules #5 (SSG #5). However, I dried the granules for 36 hours at 180° F. to constant weight.

The calculated composition of this SSG #5 is as follows:

| | Percent by weight |
|---|---|
| Zinc chloride | 5 |
| Ammonium chloride | 22 |
| Sodium chloride | 47 |
| Silica gel | 24 |
| Water | 2 |
| Total | 100 |

These Supercharged Silica Gel Granules #5 were mixed with a zinc ammonium chloride flux and proved to be an efficient flux life extender. Flux M illustrates the large percentage of SSG #5 that may be added to a standard zinc ammonium chloride flux. The life of the flux was 4.8 times the life of the same flux without SSG #5.

*Example 6.—Supercharged Activated Alumina Granules #6 (SA#6)*

In Example 2, I employed activated silica gel with an extremely high surface area as a flux life extender, subjecting it to my "Supercharging Treatment" to "wet" the surfaces of the pores with salt compatible with zinc ammonium chloride. In this example, I used activated alumina with high surface area purchased from the Aluminum Company of America. I used a grade known as "Alcoa Activated Alumina H-151, Nominal 1/8" diameter balls." According to the Suppliers' Bulletin this grade of activated alumina has the following physical properties:

| | |
|---|---|
| Form | (¹) |
| Surface area _____ sq. m. per gram__ | 350 |
| Bulk density, loose _____ lbs. per cu. ft__ | 52 |
| Bulk density, packed _____ do____ | 55 |
| Specific gravity | 3.1–3.3 |

Activated alumina is a porous form of aluminum oxide of high surface area. It adsorbs water, organic liquids and gases without change of form or properties. Activated alumina is inert to most gases and vapors and will not swell, soften or disintegrate when immersed in water.

From the loose bulk density of 52 lbs. per cu. ft. and average specific gravity (skeletal density) of 3.2, I have calculated the following figures:

ALUMINA H-151, 1/8" DIA. BALLS

| | |
|---|---|
| Bulk density _____ g. per cc__ | 0.835 |
| Particle density _____ do____ | 1.39 |
| Skeletal density _____ do____ | 3.2 |
| Pore volume _____ cc. per gram__ | 0.69 |

My method of making Supercharged Activated Alumina Granules #6 (which I am calling SA #6) is as follows:

| | Grams |
|---|---|
| Alcoa's Activated Alumina H-151 (Nominal 1/8" diameter balls) | 372 |
| 3:1 crystals (ZnCl₂·3NH₄Cl) | 150 |
| NH₄Cl | 180 |
| Water | 270 |

I held back 50 grams of the NH₄Cl to be added later. I then dissolved the 130 grams of NH₄Cl and the 150 grams of 3:1 crystals in hot water and brought the mixture to a simmer. I added slowly the 372 grams of Activated Alumina H-151. There was a great deal of air escaping from the alumina and a lot of popping and crackling with some of the spheres breaking up into smaller pieces. It appeared as though some sort of stresses in the alumina spheres were being relieved. I stirred for 15 minutes while the mixture simmered and then added the 50 grams of NH₄Cl which I have withheld for this purpose. The temperature was now about 230° F.

I dumped the mixture into a large bowl and "finished

¹ Nominal 1/8 inch diameter balls.

off" the batch with a blast of hot air (500° F.) from a heat gun while stirring and mixing the wet spheres and crystals for about five minutes. The moist SA#6 was then dried for 8 hours at 140° F., followed by drying for 24 hours at 250° F. The yield was 703 grams and the calculated composition was:

COMPOSITION OF SA #6

| | Percent |
|---|---|
| Activated alumina | 53.0 |
| Ammonium chloride | 37.2 |
| Zinc chloride | 9.8 |
| | 100.0 |

The dried SA#6 had a bulk density of 0.9, which is only a little higher than the original bulk density of the H-151 Alumina.

Without this Supercharging treatment this alumina is dangerous to use in a flux since it decrepitates and jumps all over the place, flying five or six feet from the solder pot.

I tested these Supercharged Activated Alumina Ganules #6 (SA #6) by adding them to the simple zinc ammonium chloride flux shown in Example C. This solder roll flux containing SA #6 is described in Example N. The addition of one part by weight of SA #6 to two parts of Flux C extended the life of the flux on a solder bath at 725° F. from a 3¾ hours to 16 hours, showing that it is an extremely efficient flux life extender.

As would be expected when using alumina with a skeletal density of 3.2 grams per cc., the bulk density of Supercharged Activated Alumina Granules #6 is high, 0.9 gram per cc. Hence, the particle density is also high, 1.5 grams per cc., very much higher than any of the expanded siliceous closed cell materials that have been used in the past, and considerably higher than the silica gel granules described in Examples #1 to #5 inclusive. But the surprising fact is that my SA #6 granules sink in a few minutes to the bottom of the melted flux layer, yet nevertheless are just as effective as my lower density silica gel granules which float barely submerged like water-logged logs.

The particle density of SA #6 is 1.5 grams per cc., so when the zinc ammonium chloride flux containing SA #6 is first melted, the granules *float* in the melted flux which has a density of 2.2 grams per cc. In a few minutes, the voids in the granules of SA #6 are filled with melted flux having a density of 2.2. When this happens, the net effect is of granules with a 3.2 denity (the skeletal density of H-151 Activated Alumina) immersed in a liquid with a density of 2.2, and the SA #6 granules sink to the bottom of the layer of melted flux.

*Example 7.—Superchargeable Activated Alumina Granules #7 (SA #7)*

Superchargeable Activated Alumina Granules #7, (SA #7), are the Nominal 1/8" diameter balls of Alcoa Activated Alumina H-151 that I used to make SA #6. The data pertaining to SA #7 are, therefore, tabulated in the detailed description of SA #6.

These granules are not supercharged before the flux melts, but they rapidly become supercharged by adsorbing within their pores the freshly melted flux which is rich in ammonium chloride.

Flux P shows that SA #7 is an efficient flux life extender. Alcoa Activated Alumina H-151 is also available in nominal ¼ inch diameter balls. The larger diameter balls may be used when the layer of liquid melted flux is thick enough but, for a ½ inch thick layer, the 1/8 inch diameter balls are preferable.

| | |
|---|---|
| Pore volume of alumina _____ cc. per gram__ | 0.69 |
| Surface area _____ sq. m. per gram__ | 350 |

Example 8.—Superchargeable Activated Alumina Granules #8 (SA #8)

Superchargeable Activated Alumina Granules #8, SA #8, are another grade of activated alumina in ⅛ inch balls, similar to the H–151 grade (SA #7), but with much less pore volume and surface area and higher bulk density.

These granules are not supercharged before the flux melts, but become supercharged by adsorbing the freshly melted flux high in ammonium chloride. Flux Q shows that SA #8 is a good flux extender; but not nearly as efficient as SA #7 or its supercharged version, SA #6.

Pore volume of alumina _____cc. per gram__ 0.38
Surface area _____sq. m. per gram__ 180

Example 9.—Superchargeable Molecular Sieves #9 (SMS #9)

Superchargeable Molecular Sieves #9, SMS #9, are the 8–12 mesh beads of Grade #514 made by the Davison Division of W. R. Grace & Co.[1] As described in the Suppliers Technical Bulletin these have the following physical properties:

[1] Grade 514 is one of a number of so-called "molecular sieves" furnished by this supplier. The supplier describes these materials as follows: Davison Molecular Sieves are a family of crystalline alumino-silicates with a 3-dimensional network structure of silica and alumina tetrahedra. This structure is characterized by a repeating three dimensional network of large, open alumino-silicate "cages" interconnected by smaller uniform sized pores.

Form _____ Beads
Size, mesh U.S. _____ 8–12
Bulk density _____g. per cc__ 0.67
Calc. particle density _____do____ 1.11
Skeletal density _____do____ 2.60
Pore volume _____cc. per gram__ 51

Surface area is not recorded, but the surface area of molecular sieves is high, in the range of 300 to 500 sq. m. per gram.

These granules are not supercharged before the flux melts, but are supercharged by the freshly melted zinc ammonium chloride flux. Flux S shows that SMS #9 is a highly efficient flux life extender.

Example 10.—Supercharged Silica Gel Granules #10 (SSG #10)

Supercharged Silica Gel Granules #10, SSG #10, are made by the procedure described in Example 1 for making SSG #1. It uses the same sodium metasilicate pentahydrate but mixes these granules initially for 15 minutes with moist zinc ammonium chloride ($ZnCl_2 \cdot 2NH_4Cl$). Ammonium chloride is then added and mixed in for 5 to 10 minutes.

The formulation is as follows:

|  | Grams |
|---|---|
| Sodium silicate pentahydrate | 950 |
| Zinc ammonium chloride | 100 |
| Ammonium chloride | 500 |
| Total weight | 1650 |

The wet mix was allowed to stand 36 hours and was then dried for 36 hours at 135° F. in a shallow pan. The yield of dry SSG #10 was 986 grams. It had the following calculated composition.

|  | Percent |
|---|---|
| $SiO_2$ | 27.6 |
| $ZnCl_2$ | 5.6 |
| NaCl | 53.5 |
| $NH_4Cl$ | 6.2 |
| Water by diff. | 7.1 |
|  | 100.0 |

SSG #10 was incorporated in Flux T which had a flux life of 16 hours on a solder roll at 725° F., proving that SSG #10 is a highly efficient flux life extender.

In the foregoing examples, the terms "Bulk Density," "Particle Density" and "Skeletal Density" were used with the following meaning:

Bulk Density expressed as grams per cubic centimeter, is the weight of one cubic centimeter of the loose packed granules.

Particle Density is the weight in grams of one cubic centimeter of actual volume of the individual particles. In general, when the granules are relatively uniform in size the actual volume of the granules is 60% of the total bulk volume, the remaining 40% being the volume of the voids surrounding the particles.

Skeletal Density is the density in grams per cubic centimeter of the material from which the porous granule is made, that is its skeleton.

The various flux life extenders described in the foregoing examples were tested under conditions that duplicated commercial conditions as closely as possible. In these tests a roll solder bath was used that was made to duplicate a typical commercial roll solder bath in every detail except for the width of the bath and of the roll.

Specifically, the solder bath used in all of the following tests comprises a thick walled metal tank 10 inches long, 6¼ inches wide and 4 inches deep. A solder roll 6 inches long and 4 inches in diameter was mounted across the tank with its center line equidistant between the ends and 2½ inches above the bottom of the tank. The tank was filled with a quantity of 2–98 solder sufficient to maintain the level of the molten solder at the center line of the roll (about 35 pounds). The tank is gas heated and thermostatically controlled to maintain the temperature of the solder to within 2° F.—of the indicated temperature. The roll was rotated at 120 r.p.m.

In each test, the flux was placed on top of the molten solder in that portion of the tank where the rotating roll reentered the solder an area 3 inches by 6¼ inches. The flux in each instance was stirred once each hour. In every test the flux was considered to be spent as soon as noticeable areas on the rotating roll failed to be wetted by the molten solder. The test results were reproducible to less than fifteen minutes and the test results correlated very well with field results under commercial conditions.

FLUX TESTS

Test A (control)

| Composition of Flux A: | Parts by weight |
|---|---|
| Powdered zinc chloride | 670 |
| Powdered ammonium chloride | 330 |

300 grams of Flux A were added to the solder bath at 725 F. The flux melted readily with active boiling and an initial evolution of voluminous clouds of white ammonium chloride smoke which gradually decreased. One hour after the start, an addition of 100 grams of Flux A was made. Two hours after the start, the solder roll showed indications of poor tinning and a final addition of 100 grams of Flux A was made. Total charge on the solder bath was 500 grams providing a layer of melted zinc ammonium chloride flux of approximately one-half inch in thickness.

Flux A was spent at the end of 3½ hours.

Test B (control)

| Composition of Flux B: | Parts by weight |
|---|---|
| $ZnCl_2 \cdot 2NH_4Cl$ | 780 |
| Zinc oxide | 70 |

300 grams of Flux B were added to the solder bath at 725° F. The flux melted readily with active boiling and an initial evolution of voluminous clouds of white ammonium chloride smoke, which gradually decreased. One hour after the start, an addition of 100 grams of Flux B was made. Two hours after the start, the solder roll showed indications of poor tinning and a final addition of 100 grams of Flux B was made. Total charge on the solder bath was 500 grams of flux.

Flux B was spent at the end of 3½ hours.

When Flux B is heated, the zinc oxide reacts with some of the ammonium chloride, thereby reducing the amount of ammonium chloride and increasing the amount of zinc chloride. After melting and reacting, the ammonium chloride is 31% of the total chlorides.

*Test C (control)*

Composition of Flux C:   Parts by weight
  $ZnCl_2 \cdot 2NH_4Cl$ _____ 950
  Zinc oxide _____ 50

300 grams of Flux C were added to the solder bath at 725° F. The flux melted satisfactorily, but more slowly than either Flux A or Flux B. After melting, it boiled violently with an evolution of voluminous clouds of white ammonium chloride smoke, which gradually decreased. One hour after the start, an addition of 100 grams of Flux C was made. Two hours after the start, a final addition of 100 grams of Flux C was made. Total charge was 500 grams of flux.

Flux C was spent at the end of 3¾ hours.

After the reaction of ammonium chloride with the zinc oxide, the freshly melted Flux C contained 36% of ammonium chloride on the total chlorides.

*Test D*

Composition of Flux D:   Parts by weight
  $ZnCl_2 \cdot 2NH_4Cl$ _____ 780
  Zinc oxide _____ 70
  Superchraged Silica Gel Granules #1 _____ 150

300 grams of Flux D were added to the solder bath at 725° F. The flux melted readily with active boiling and an initial evolution of voluminous clouds of white ammonium chloride smoke, which gradually decreased. One hour after the start, an addition of 100 grams of Flux D was made. Five hours after the start, more flux was needed to maintain a layer of melted zinc ammonium chloride flux of approximately one-half inch in thickness. A final addition of 100 grams of Flux D was made, bringing the total charge on the solder bath to 500 grams of flux.

Flux D was spent at the end of 14 hours.

Percentage of ammonium chloride on melted and reacted flux is 29%.

Bulk volume of granules, cc. per 100 cc. melted flux _____ 29
Free liquid layer, percent _____ 72
Granule layer, percent _____ 28

*Test E*

Composition of Flux E:   Parts by weight
  Powdered zinc chloride _____ 440
  Powdered ammonium chloride _____ 340
  Zinc oxide _____ 70
  Supercharged Silica Gel Granules #1 _____ 150

300 grams of Flux E were added to the solder bath at 725° F. The flux melted readily with active boiling and an initial evolution of voluminous clouds of white ammonium chloride smoke, which gradually decreased. One hour after the start, an addition of 100 grams of Flux E was made to bring the layer of melted zinc ammonium chloride flux up to the desirable thickness of not less than one-half inch. Five hours after the start, a final addition of 100 grams of Flux E was made, bringing the total charge of flux on the solder bath to 500 grams.

Flux E was spent at the end of 14 hours.

Percentage of ammonium chloride on total ammonium chloride plus zinc chloride is 29%.

Bulk volume of granules, cc. per 100 cc. melted flux _____ 29
Free liquid layer, percent _____ 72
Granule layer, percent _____ 28

*Test F (control)*

Composition of Flux F:   Parts by weight
  $ZnCl_2 \cdot 2NH_4Cl$ _____ 850
  Powdered zinc chloride _____ 150

300 grams of Flux F were added to the solder bath at 725° F. The flux melted slowly, more slowly than other fluxes with less ammonium chloride; but, after losing a little ammonium chloride through sublimation at this high temperature, it melted to a thin clear liquid, typical of a pure zinc ammonium chloride flux with from 10 to 36 percent ammonium chloride at 725° F.

Initially, the smoking was more pronounced than any of the other fluxes previously tested, Fluxes A to E inclusive, but, in a short time, the smoking decreased and was about the same as Fluxes A, B and C.

One hour after the start, an addition of 100 grams of Flux F was made, followed one hour later by a final addition of 100 grams.

Flux F was spent at the end of 3¾ hours.

Percentage of ammonium chloride on total ammonium chloride plus zinc chloride is 37%.

*Test G*

Composition of Flux G:   Parts by weight
  $ZnCl_2 \cdot 2 NH_4Cl$ _____ 734
  Zinc oxide _____ 66
  Superchraged Silica Gel Granules #1 _____ 200

300 grams of Flux G were added to the solder bath at 725° F. The flux melted readily with active boiling and an initial evolution of voluminous clouds of white ammonium chloride smoke, which gradually decreased. One hour after the start, 100 grams of Flux G were added. Five hours after the start, a final addition of 100 grams of Flux G was made.

Flux G was spent at the end of 17 hours.

Percentage of ammonium chloride on melted and reacted flux is 28%.

Bulk volume of granules, per 100 cc. melted flux cc___ 40
Free liquid layer, percent _____ 63
Granule layer, percent _____ 37

*Test H*

Composition of Flux H:   Parts by weight
  $ZnCl_2 \cdot 2 NH_4Cl$ _____ 665
  Zinc oxide _____ 35
  Supercharged Silica Gel Granules #1 _____ 300

300 grams of Flux H were added to the solder bath at 725° F. The flux melted satisfactorily, but more slowly than fluxes with less ammonium chloride. After melting, it boiled violently with an evolution of voluminous clouds of white ammonium chloride smoke, which gradually decreased. One hour after the start, 100 grams of flux were added and five hours after the start, the final addition of 100 grams was made.

Flux H was spent at the end of 12 hours.

Percentage of ammonium chloride on melted and reacted flux is 31%.

Bulk volume of granules, per 100 cc. melted flux cc___ 60
Free liquid layer, percent _____ 45
Granule layer, percent _____ 55

*Test I*

Composition of Flux I:   Parts by weight
  $ZnCl_2 \cdot 2 NH_4Cl$ _____ 730
  Zinc oxide _____ 39
  Supercharged Silica Gel Granules #2 _____ 231

300 grams of Flux I were added to the solder bath at 725° F. The flux melted rapidly with active boiling and an initial evolution of voluminous clouds of white ammonium chloride smoke. After one-half hour the smoke began to decrease and at the end of one hour it was smoking heavily but not excessively. After the first few minutes, the liquid began to crystallize on the surface where it was cooler than the solder-liquified flux interface. Gradually these crystals remelted. One hour later, 100 grams of Flux I were added. Five hours after the start, a final addition of 100 grams of Flux I was made.

Flux I was spent at the end of 15 hours.

Percentage of ammonium chloride on melted and reacted flux is 43%.

Bulk volume of granules, per 100 cc. melted flux cc____ 24
Free liquid layer, percent _____ 78
Granule layer, percent _____ 22

Test J

Composition of Flux J: Parts by weight
   Powdered zinc chloride _____ 485
   Powdered ammonium chloride _____ 269
   Zinc oxide _____ 15
   Supercharged Silica Gel Granules #2 _____ 231

300 grams of Flux J were added to the solder bath at 725° F. The flux melted readily with active boiling and an initial evolution of voluminous clouds of white ammonium chloride smoke which gradually decreased. After initial melting, it appeared to crystallize and then gradually remelted as the lead oxide reacted with some of the ammonium chloride. One hour later, 100 grams of Flux J were added. Five hours after the start, a final addition of 100 grams of Flux J was made.

Flux J was spent at the end of 15 hours.

Percentage of ammonium chloride on melted and reacted flux is 40%.

Bulk volume of granules, per 100 cc. melted flux cc____ 24
Free liquid layer, percent _____ 78
Granule layer, percent _____ 22

Test K

Composition of Flux K: Parts by weight
   $ZnCl_2 \cdot 2NH_4Cl$ _____ 826
   Zinc oxide _____ 74
   Superchargeable Silica Gel Granules #3 _____ 100

300 grams of Flux K were added to the solder bath at 725° F. The flux melted readily with active boiling and an initial evolution of voluminous clouds of white ammonium chloride smoke, which gradually decreased. One hour later, 100 grams of flux were added. Five hours after the start, a final addition of 100 grams was made.

Flux K was spent at the end of 15 hours.

Percentage of ammonium chloride on melted and reacted flux is 31%.

Bulk volume of granules, cc. per 100 cc. melted flux __ 36
Free liquid layer, percent _____ 68
Granule layer, percent _____ 32

Test L

Composition of Flux L: Parts by weight
   $ZnCl_2 \cdot 2NH_4Cl$ _____ 854
   Zinc oxide _____ 76
   Superchargeable Silica Gel Granules #3 _____ 70

300 grams of Flux L were added to the solder bath at 725° F. The flux melted readily with active boiling and an initial evolution of voluminous clouds of white ammonium chloride smoke, which gradually decreased. One hour later, 100 grams of flux were added. Five hours after the start, a final addition of 100 grams was made.

Flux L was spent at the end of 12 hours.

Percentage of ammonium chloride on melted and reacted flux is 31%.

Bulk volume of granules, cc. per 100 cc. melted flux __ 24
Free liquid layer, percent _____ 78
Granule layer, percent _____ 22

Test M

Composition of Flux M: Parts by weight
   $ZnCl_2 \cdot 2NH_4Cl$ _____ 665
   Zinc oxide _____ 35
   Supercharged Silica Gel Granules #5 _____ 300

300 grams of Flux M were added to the solder bath at 725° F. The flux melted readily with active boiling and an initial evolution of voluminous clouds of white ammonium chloride smoke, which gradually decreased. One hour later, 100 grams of flux were added. Five hours after the start, a final addition of 100 grams was made.

Flux M was spent at the end of 18 hours.

Percentage of ammonium chloride on melted and reacted flux is 35%.

Bulk volume of granules, cc. per 100 cc. melted flux _ 46
Free liquid layer, percent _____ 57
Granule layer, percent _____ 43

Test N

Composition of Flux N: Parts by weight
   $ZnCl_2 \cdot 2NH_4Cl$ _____ 636
   Zinc oxide _____ 34
   Supercharged Activated Alumina Granules #6 _ 330

300 grams of Flux N were added to the solder bath at 725° F. The flux melted well with the SA #6 granules floating and bubbling for the first few minutes. After a few minutes, the Supercharged Alumina had sunk to the bottom of the melted flux layer. The 1/8" spheres had fractured, mostly in sizes about one-quarter the size of the original. After considerable initial smoking, the smoking decreased to a reasonable amount. After one hour, 100 grams of Flux N were added. A final addition of 100 grams of Flux N was made at the end of the fifth hour.

Flux N was spent at the end of 16 hours.

Percentage of ammonium chloride on melted flux is 45%. However, before the supercharged ammonium chloride is extracted from the SA #6 granules, the percentage of ammonium chloride is only 36%, well below the critical 38% maximum for melting. This example illustrates the advantage of supercharging with a large amount of ammonium chloride.

Bulk volume of granules, cc. per 100 cc. melted flux _ 58
Free liquid layer, percent _____ 50
Granule layer, percent _____ 50

The life of Flux C, which is the basic zinc ammonium chloride flux used in Flux N, was only 3¾ hours. Thus, the use of Supercharged Activated Alumina Granules #6 has multiplied the life of this flux four times.

Test O

Composition of Flux O: Parts by weight
   $ZnCl_2 \cdot 2NH_4Cl$ _____ 760
   Zinc oxide _____ 40
   Supercharged Activated Alumina Granules #6 ___ 200

300 grams of Flux O were added to the solder bath at 725° F. The flux melted well with the SA #6 floating and bubbling for the first few minutes. After a few minutes, the Supercharged Alumina Granules sank to the bottom of the melted flux. The 1/8" spheres fractured in the melted flux. The flux smoked heavily at first, but after about one-half hour the smoking decreased to a reasonable amount. 100 grams of Flux O were added after one hour. A final addition of 100 grams was made at the end of the fifth hour.

Flux O was spent at the end of 16 hours.

Percentage of ammonium chloride on melted and reacted flux is 41%.

Bulk volume of granules, cc. per 100 cc. melted flux _ 32
Free liquid layer, percent _____ 70
Granule layer, percent _____ 30

Although Flux O had less SA #6 than Flux N, nevertheless, the flux life was the same, 16 hours. This is 4 times as long as the basic flux without Supercharged Alumina.

Test P

Composition of Flux P:                      Parts by weight
   $ZnCl_2 \cdot 2NH_4Cl$ ------------------------------- 849
   Zinc oxide ------------------------------------------ 45
   Supercharged Activated Alumina Granules #7 ---------- 106

300 grams of Flux P were added to the solder bath at 725° F. The alumina spheres decrepitated badly, exploding and popping all over the place, so badly that the bath had to be covered for ten minutes until the alumina adsorbed the melted flux and sank to the bottom of the melted flux layer. At the end of one hour, 100 grams Flux P were added with the same precautions to keep the alumina from popping out of the solder bath. Similarly, the final addition of 100 grams was made five hours after the start.

Flux P was spent at the end of 14 hours.

Percentage of ammonium chloride on melted and reacted flux is 36%.

Bulk volume of granules, cc. per 100 cc. melted flux _ 32
Free liquid layer, percent _____ 70
Granule layer, percent _____ 30

Test Q

Composition of Flux Q:                      Parts by weight
   $ZnCl_2 \cdot 2NH_4Cl$ ------------------------------- 779
   Zinc oxide ------------------------------------------ 41
   Superchargeable Activated Alumina Granules #8 ------- 180

The Flux Q was added to the solder bath at 725° F. using the same procedure and precautions used in Test P because this different, but likewise untreated, activated alumina behaved the same as SA #7. The spheres exploded and popped very badly and the solder bath had to be covered until the popping ceased.

Flux P was spent at the end of 8 hours. This was a much shorter time, about half the average life of Fluxes N, O and P. Although I do not know for certain why there is this large difference in the performance of the two grades of activated alumina, I believe that it may be due to the much lower surface area, higher particle density and lower pore volume of SA #8.

Percentage of ammonium chloride on melted and reacted flux is 36%.

Bulk volume of granules, cc. per 100 cc. melted flux __ 50
Free liquid layer, percent _____ 57
Granule layer, percent _____ 43

Test R

In this test, a series of 12 fluxes containing increasing amounts of Superchargeable Silica Gel Granules #4 were compared on the solder roll at 725° F. with the basic flux (Flux B) which contained no granules. The basic flux contained 780 grams of $ZnCl_2 \cdot 2NH_4Cl$ and 70 grams of zinc oxide. When melted and the zinc oxide had reacted, it had a melted weight of 805 grams and contained 31% of ammonium chloride. The density of the melted flux was 2.2.

The composition of the Superchargeable Silica Gel Granules #4 is as follows:

|  | Percent |
|---|---|
| $SiO_2$ | 33.4 |
| NaCl | 64.8 |
| $NH_4Cl$ | 1.8 |

The bulk density of the pure silica gel granules obtained from the SSG #4 by removing the sodium chloride and ammonium chloride is 0.38. Its skeletal density is 2.2.

Superchargeable Silica Gel Granules #4 was selected for this series study for several reasons.

Experiments had shown that SSG #4 was an extremely effective flux life extender, even at low concentrations, yet could be used at high concentrations without choking up the flux.

It contained a very low percentage of ammonium chloride, 1.8%, so using different quantities of SSG #4 would not alter the ratio of ammonium chloride to zinc chloride too much.

Because of the pretreatment which occurs in the manufacturing process of the SSG #4, the granules are readily and rapidly supercharged by the freshly melted zinc ammonium chloride flux.

The size and shape of granules, approximately spherical and 12 to 16 mesh, are in the desirable range for a flux layer one-half inch in thickness. These uniform size and spherical shaped granules are readily and cheaply manufactured and controlled accurately by my new method of making spherical silica gel granules.

| | | Flux B | Flux R-3 | Flux R-6 | Flux R-9 | Flux R-12 | Flux R-15 | Flux R-18 | Flux R-21 | Flux R-24 | Flux R-27 | Flux R-30 | Flux R-33 | Flux R-36 |
|---|---|---|---|---|---|---|---|---|---|---|---|---|---|---|
| 1 | Composition of Flux: | | | | | | | | | | | | | |
| 2 | $ZnCl_2+2NH_4Cl$, gms | 780 | 780 | 780 | 780 | 780 | 780 | 780 | 780 | 780 | 780 | 780 | 780 | 780 |
| 3 | ZnO, gms | 70 | 70 | 70 | 70 | 70 | 70 | 70 | 70 | 70 | 70 | 70 | 70 | 70 |
| 4 | SSG #4, gms | 0 | 25 | 51 | 80 | 110 | 142 | 176 | 214 | 256 | 298 | 344 | 398 | 452 |
| 5 | Total weight, gms | 850 | 875 | 901 | 930 | 960 | 992 | 1,026 | 1,064 | 1,106 | 1,148 | 1,194 | 1,248 | 1,302 |
| 6 | Total weight after melting and after ZnO reacts, gms | 805 | 830 | 856 | 885 | 915 | 947 | 918 | 1,019 | 1,061 | 1,103 | 1,149 | 1,203 | 1,257 |
| 7 | Percent SSG #4 on total melted weight | 0 | 3.0 | 6.0 | 9.0 | 12.0 | 15.0 | 18.0 | 21.0 | 24.0 | 27.0 | 30.0 | 33.0 | 36.0 |
| 8 | Volume melted free flux, cc | 366 | 366 | 366 | 366 | 366 | 366 | 366 | 366 | 366 | 366 | 366 | 366 | 366 |
| 9 | Volume chlorides in SSG #4, cc | 0 | 8 | 16 | 24 | 35 | 45 | 56 | 68 | 81 | 95 | 109 | 126 | 143 |
| 10 | Total volume, melted flux, cc | 366 | 374 | 382 | 391 | 401 | 411 | 422 | 434 | 447 | 461 | 475 | 492 | 509 |
| 11 | Bulk volume, $SiO_2$ granules, cc | 0 | 22 | 45 | 70 | 97 | 125 | 155 | 188 | 225 | 262 | 302 | 350 | 398 |
| 12 | Bulk Volume, Granules per 100 cc. Melted Flux | 0 | 6 | 12 | 18 | 24 | 30 | 37 | 43 | 50 | 57 | 64 | 71 | 78 |
| 13 | Volume of $SiO_2$ skeletons, cc | 0 | 4 | 8 | 12 | 17 | 22 | 27 | 33 | 39 | 45 | 52 | 60 | 69 |
| 14 | Volume melted flux plus skeletons, cc | 366 | 378 | 390 | 403 | 418 | 433 | 449 | 467 | 486 | 506 | 527 | 552 | 578 |
| 15 | Less volume of granule layer, cc | 0 | 22 | 45 | 70 | 97 | 125 | 155 | 188 | 225 | 262 | 302 | 350 | 398 |
| 16 | Volume free liquid layer, cc | 366 | 356 | 345 | 333 | 321 | 308 | 294 | 279 | 261 | 244 | 225 | 202 | 180 |
| 17 | Percent Free Liquid | 100 | 94 | 88 | 83 | 77 | 71 | 65 | 60 | 54 | 48 | 43 | 37 | 31 |
| 18 | Percent Granule layer | 0 | 6 | 12 | 17 | 23 | 29 | 35 | 40 | 46 | 52 | 57 | 63 | 69 |
| 19 | Flux life, hours at 725° F | 3.5 | 4.5 | 6 | 9 | 13 | 16 | 18 | 18 | 18 | 14 | 10 | 7 | 5 |

This R-Series were numbered R–3, R–6, etc. with number denoting the percentage of SSG #4 on the total melted weight of flux and SSG #4. For example, R–12 Flux had the following composition:

| | |
|---|---|
| $ZnCl_2 \cdot 2NH_4Cl$ _____grams__ | 780 |
| Zinc oxide _____do____ | 70 |
| Superchargeable Silica Gel Granules #4 ____do____ | 110 |
| Total weight of Flux R–12 _____do____ | 960 |
| Total weight after melting _____do____ | 915 |
| Quantity SSG #4 on total melted weight _percent__ | 12 |
| Volume of melted flux, inc. salts in SSG #4 ___cc__ | 401 |
| Bulk volume $SiO_2$ granules _____cc__ | 97 |
| Bulk volume $SiO_2$ granules per 100 cc. melted flux _____cc__ | 24 |
| Free liquid layer _____percent__ | 23 |

The R–12 Flux was spent at the end of 13 hours.

The compositions, ratios, and flux lives of this R–3 to R–36 Series are tabulated in the foregoing table.

When the free liquid layer approaches 30% of the total flux thickness the flux is heavier than desired, but is still useful but requires frequent stirring.

Test S

| Composition of Flux S: | Parts by weight |
|---|---|
| $ZnCl_2 \cdot 2NH_4Cl$ _____ | 849 |
| Zinc oxide _____ | 45 |
| Superchargeable Molecular Sieves #9 _____ | 106 |

300 grams of Fux S were added to the solder bath at 725° F. The Molecular Sieves #9 floated momentarily, only to sink to the bottom of the melted flux after their pores had been filled or "supercharged" with the freshly melted flux high in ammonium chloride. Later the small spheres floated as the melted flux lost ammonium chloride and its density exceeded the skeletal density (2.6) of the molecular sieves #9.

The melted zinc ammonium chloride held within the pores of these molecular sieves (or molecular traps) retains its ammonium chloride content at a higher level and, therefore, has a lower density than the zinc ammonium chloride melted flux in the liquid layer, after it has lost a large amount of its ammonium chloride.

Flux S was spent at the end of 15 hours.

Percentage of ammonium chloride on melted and reacted flux is 36%.

| | |
|---|---|
| Bulk volume of granules, cc. per 100 cc. melted flux __ | 41 |
| Free liquid layer, percent _____ | 63 |
| Granule layer, percent _____ | 37 |

Test T

| Composition of Flux T: | Parts by weight |
|---|---|
| $ZnCl_2 \cdot 2NH_4Cl$ _____ | 744 |
| Zinc oxide _____ | 39 |
| Supercharged Silica Gel Granules #10 _____ | 217 |

300 grams of Flux T were added to the solder bath at 725° F. The Flux T melted readily with the usual boiling and heavy smoking characteristic of a flux high in ammonium chloride. After one-half an hour, the smoking was greatly reduced and the boiling stopped. 100 grams were added one hour from the start and a final 100 grams five hours from the start.

Flux T was spent at the end of 16 hours.

Percentage of ammonium chloride on melted and reacted flux is 37%.

| | |
|---|---|
| Bulk volume of granules, cc. per 100 c. melted flux __ | 39 |
| Free liquid layer, percent _____ | 63 |
| Granule layer, percent _____ | 37 |

METHOD OF MAKING SPHERICAL ACTIVATED SILICA GEL GRANULES

The procedure set forth in Examples 1, 4 and 10 appears to be a novel method of making an unusually light, highly porous, spherical, activated silica gel granule with its residual surface areas specially treated to increase its reactivity to highly polar gases such as $NH_3$, $CO_2$, HCl, and $H_2S$ and to regulate the relative moisture absorbency. This method is also especially adapted to making spherical granules of approximately the same diameter which results in maximum bulk volume per unit of weight and which affords the lowest resistance to passage of gases flowing through a bed of these activated silica gel granules.

Sodium metasilicate pentahydrate, $Na_2SiO_3 \cdot 5H_2O$ contains only 28.3% $SiO_2$ and yet has a very high percentage of combined $H_2O$. Because of the relatively low ratio of molecules $SiO_2$ to $Na_2O$ (1:1) and the low percentage by weight of $SiO_2$ (28.3%), sodium metasilicate pentahydrate is not a logical choice for use in manufacturing silica gel. Liquid solutions of sodium silicate containing $SiO_2$ and $Na_2O$ in the ratio of 3.3 molecules of $SiO_2$ to 1 molecule of $Na_2O$ are not only much cheaper on a dry pound weight basis but are also very much cheaper on a basis of pounds of $SiO_2$ content. However, I have been unable to produce the unique, very light, highly porous, activated and treated silica gel granules of spherical contour and approximately uniform size which are the subject of my invention by using any of the conventional well known silica gel methods or processes.

The conventional methods vary, but essentially they consist of forming a wet silica gel mass by adding acids or salts to sodium silicate solutions (usually with high $SiO_2:Na_2O$ ratios such as 3.3:1), allowing this mass to set for several hours until it is well solidified and consolidated, breaking it up into wet granules and drying. An alternative method is to dry the large masses of silica gel and then crush and screen the relatively hard dense silica gel blocks. In most cases, the silica gel is washed free of its salts, such as sodium chloride, sodium sulfate, etc. This washing can be performed either before or after drying.

These processes all result in fragmented particles of variable size and shape. When placed together in a random bed, the particles tend to lock and bridge together and are not free flowing as are the spherical granules of uniform size and shape produced by my new method.

In practice, my invention is extremely simple. I purchase uniform sized "dry" granules of the chemically stable, precise formulation compound, sodium metasilicate pentahydrate ($Na_2SiO_3 \cdot 5H_2O$), and then react it in the "dry" solid state with ammonium chloride, ammonium sulfate, ammonium nitrate, or some similar ammonium salt which will neutralize the alkalinity of the sodium metasilicate and produce silica gel, ammonia gas, water and a corresponding sodium salt.

With this fundamentally simple process, by controlling the successive steps, I am able to produce a product of extremely low bulk density and high porosity and to maintain the original shape and size of the individual sodium metasilicate pentahydrate particles.

The preferred sodium metasilicate pentahydrate for use in this process is a grade of spherical uniform size particles which are produced commercially and can be purchased in sifted graded size as desired. The melting point of this sodium metasilicate pentahydrate is 162° F. I prefer a 12 mesh size, which is approximately $\frac{1}{32}''$ to $\frac{1}{16}''$ in diameter; but, the size is not material to my invention. I prefer this size only because some of the useful applications employ a layer of spherical activated silica gel granules only ¼ to ½ inch in thickness and this size granule provides enough individual granules to maintain a proper layer.

In this process, which is set forth in some detail in Example 1 above as well as in Examples 4 and 10, I dry mix the dry sodium metasilicate granules with approximately a stoichiometric amount based on the ammonium content of a finely divided ammonium containing salt. As pointed out above, the reaction is normally spontaneous. However, under low humidity conditions it may be slow to start and under these conditions up to 1% of water which may be added in the form of a fine spray or which may be used to moisten the salt crystals or particles may be added to trigger the reaction. The use of exactly a stoichiometric amount of the salt is not necessary or in any way critical. A slight excess may be desired to insure completion of the reaction and an even greater excess may be used if the presence of the ammonium salt is desired in the final product. For some uses however the present of a core of unreacted metasilicate in each granule may be desired in which case a deficiency of the ammonium salt is used.

Upon mixing, the particles of the salt coat the surface of the granules. As soon as a substantially uniform distribution is accomplished, the coated particles are spread out in thin layers no more than several inches thick preferably on large trays.

It is essential that the first stage of the reaction proceed slowly. As pointed out in Example 1, the ammonium salt reacts with the metasilicate releasing water including the water of hydration and ammonia and forming soilica gel and a salt. If the reaction proceeds too rapidly, the water is released at too fast a rate and the excess tends to drain from the granules dissolving some of the ammonium salt and carrying it away from contact with the particles. If this is permitted, the reaction will not proceed to completion and the resulting product tends to be in the form of fused agglomerates which upon cracking and crushing will contain irregularly shaped fractured particles and substantial quantities of powder and dust.

The rate of the reaction is controlled by controlling the temperature. A suitable rate is achieved if the mix is maintained at about normal room temperature. At this temperature, the first stage of the reaction is completed in twenty four to thirty six hours. Completion of the first stage of the reaction is detected by the disappearance from the surface of the granules of any visible ammonium salt particles when inspected under a low power glass. The overall time required for the first stage of the reaction may be reduced somewhat by gradually raising the temperature of the mixture to a temperature not in excess of 110° F. The reaction temperature need not be as high as even normal room temperature if longer reaction times are not objectionable although at temperatures below about 40° the reaction substantially ceases.

Once the first stage of the reaction has been completed and there are no crystals or particles of the ammonium salt visible on the surface of the granule, the temperature if desired may be raised to a higher level to force to completion the reaction of the ammonium salt with the metasilicate. Good results are obtained by holding the reaction mixture at about 130° F. to 140° F. for 24 to 36 hours. Slightly higher temperatures can be used. However, it is essential that no portion of the mixture reach a temperature in excess of or even approaching the melting point of the metasilicate (i.e. 162° F. in the case of sodium metasilicate pentahydrate) while any substantial quantity of the metasilicate remains unreacted.

Completion of the reaction is indicated by the absence of any substantial evolution of ammonia while the reaction mixture is maintained at 140° F. As soon as the reaction has been completed, the temperature may be raised to 160° F., 180° F. or even higher to drive off the remaining water and to harden the particles. Upon completion of the reaction and after cooling, the resulting large block of activated silica gel granules break up readily into spherical granules of approximately the same size and shape as the original metasilicate granules. The finished granules may be washed if desired to remove all or part of the salt content. Because of their uniform size and shape these activated silica gel granules may be used for a variety of purposes and are particularly advantageous for use in packed columns for the purification of gases.

While the flux life extenders of the present invention have been described for use in combination with zinc ammonium chloride flux compositions, their activity is physical in nature. For this reason the chemical identity of the particular flux with which they are used is of no particular importance. These flux life extenders are equally useful and effective in any melted flux where one component is more volatile than the mass of melted flux and they may be used as indicated in Example 2 to introduce other components slowly into a melted flux composition.

I claim:

1. A solder flux of the type adapted to be used on high temperature solder baths, said flux consisting essentially of a fusible fluxing composition consisting essentially of a zinc-ammonium chloride composition and an effective amount in the order of at least about 6 cubic centimeters bulk volume per 100 cubic centimeters of fused fluxing composition of a flux life extender, said flux life extender comprising granules of a porous particulate absorbent selected from the group consisting of activated alumina, silica gel and activated alumino-silicate having a surface area of at least 100 square meters per gram and a volume of available pores of at least 0.15 cubic centimeter per gram.

2. A solder flux of the type adapted to be used on high temperature solder baths, said flux consisting essentially of a fusible fluxing composition consisting essentially of a zinc-ammonium chloride composition and an effective amount in the order of at least about 1% by weight of the weight of the fusible fluxing composition of a flux life extender, said flux life extender comprising granules of a porous particulate absorbent selected from the group consisting of activated alumina, silica gel and activated alumino-silicate having a surface area of at least 100 square meters per gram and a volume of available pores of at least 0.15 cubic centimeter per gram.

3. A solder flux as claimed in claim 1 wherein said flux life extender comprises granules having an average diameter substantially in excess of that which will pass through 100 mesh U.S.

4. A solder flux as claimed in claim 1 wherein said flux life extender comprises granules which are substantially inert at the temperature of use in the presence of the molten solder and the melted flux.

5. A solder flux as claimed in claim 1 wherein the pores in the granules comprising said flux life extender are precharged with a flux activating ingredient.

6. A solder flux as claimed in claim 5 wherein said flux activating ingredient comprises an inorganic salt selected grom the group consisting of the alkaline chlorides, the alkaline earth chlorides, the metal chlorides and ammonium chloride and combinations thereof.

7. A flux life extender especially adapted for use in connection with solder fluxes of the type intended for use with high temperature solder baths and to extend the useful life of such flux on such bath, said flux life extender comprising granules of a particulate absorbent selected from the group of absorbents consisting of activated alumina, silica gel and activated alumino-silicate, said absorbent having a surface area of at least 100 square meters per gram and a volume of available pores of at least 0.15 cubic centimeter per gram wherein said available pores in said granules are pre-charged with a flux activating ingredient comprising an inorganic salt selected from the group consisting of the alkaline chlosides, the alkaline earth chlorides, the metal chlorides, ammonium chloride and combinations thereof.

(References on following page)

References Cited

UNITED STATES PATENTS

| | | | |
|---|---|---|---|
| 2,114,123 | 4/1938 | Heuser | 23—182 |
| 2,662,840 | 12/1953 | Schilling et al. | 148—23 |
| 2,699,376 | 1/1955 | Hay | 252—451 X |
| 3,059,997 | 10/1962 | Schwartz | 252—451 X |
| 3,081,154 | 3/1963 | Alker et al. | 23—182 |

DAVID L. RECK, *Primary Examiner.*

H. F. SAITO, *Assistant Examiner.*